Patented Feb. 2, 1937

2,069,403

UNITED STATES PATENT OFFICE 2,069,403

PROCESS FOR MAKING ALKALI METAL ALCOHOLATES

George Lewis Cunningham, Niagara Falls, N. Y., assignor to The Mathieson Alkali Works, Inc., New York, N. Y., a corporation of Virginia No Drawing. Application February 24, 1936, Serial No. 65,491

8 Claims. (Cl. 260—156)

This invention relates to improvements in the manufacture of alkali metal alcoholates. More particularly, this invention relates to improvements in the manufacture of alcoholates of alcohols having four carbon atoms, or less, but it comprehends the production of alcoholates of higher alcohols, as well as other derivatives such as xanthates and alcohol carbonates, from such lower alcoholates as intermediates.

Alkali metal alcoholates can be prepared, for example, by direct reaction between the alkali metal as such and the alcohol or by reaction between the alkali metal hydroxide and the alcohol. The cost of the first of these methods has precluded its use industrially, but much effort has been devoted to the purpose of making the second commercially practicable. The development of the second of these methods has not reached any finally satisfactory conclusion for, in spite of improvements which have been made, problems due to the incomplete character of the reaction have persisted.

I have discovered that alkali metal alcoholates of alcohols having four carbon atoms or less can be produced, with satisfactory reaction rates and with satisfactory reaction efficiencies, by reacting an anhydrous alcohol having four carbon atoms or less with an alkali metal amalgam in the presence of an electrically conducting but non-amalgamating electrode in contact with the amalgam and the alcohol. Carbon, and particularly graphite, makes a particularly advantageous contact electrode. Metallic electrodes are also useful. For example, alloys of iron and chromium, including alloys of iron, chromium and nickel, make particularly advantageous contact electrodes. The immediate product of the reaction is a solution of the alcoholate in the alcohol. The general reaction can be typified as folllows:

$$2CH_3OH + 2Na = 2CH_3ONa + H_2$$

The alcoholate can be separated from the unreacted alcohol, and this alcohol returned to the reaction with the amalgam, or this alcohol solution of the alcoholate can be further processed for the production of higher alcoholates or xanthates or alcohol carbonates, for example.

The alcohol supplied to the reaction with the amalgam should be free from water. Commercial ethyl alcohol, for example, often contains as much as 3% of water. Two advantageous methods for eliminating such water follow: The alcohol is treated with sodium amalgam in proportion sufficient to provide about 1.3 parts (by weight) of sodium per part of water in the alcohol in the presence of a contact electrode, of carbon for example, until the water present has been converted to sodium hydroxide and the alcohol, free from water, is then distilled from the reaction mixture. The alcohol is treated with a proportion of an alcoholate, such as sodium methylate or ethylate, sufficient to convert the water present to the corresponding hydroxide and the alcohol, free from water, is then distilled from the reaction mixture. The general reaction, in alcohol, involved in the second of these methods can be typified as follows:

$$C_2H_5ONa + H_2O = C_2H_5OH + NaOH$$

This invention is of special utility in connection with the manufacture of xanthates. The production of xanthates in the presence of water involves reduced yields, contamination of the product with impurities such as thiocarbonates and sulphides, and lack of product stability, probably because of the presence of such impurities. These difficulties can be avoided or minimized by reacting carbon disulphide with an anhydrous alcohol solution of an alcoholate produced in accordance with this invention to form the xanthate.

This invention is also of special utility in connection with the manufacture of alkali metal alcohol carbonates. Such alcohol carbonates can be produced directly by carbonating, with dry carbon dioxide, an anhydrous alcohol solution of an alcoholate produced in accordance with this invention, the alcohol carbonate being precipitated by the carbonation. The alcohol solution remaining after separation of the alcohol carbonate can be reacted with an alkali metal amalgam in accordance with this invention and the carbonation repeated and so on.

Metallic contact electrodes useful for the purposes of this invention comprise particularly those made of the following alloys:

|  |  | Per cent |
|---|---|---|
| No. 1 | Iron | 85–88 |
|  | Chromium | 12–15 |
|  | Carbon | 0.12 maximum |
| No. 2 | Iron | 70–77 |
|  | Chromium | 23–30 |
|  | Carbon | 0.35 maximum |
| No. 3 | Iron | 72–76 |
|  | Chromium | 17–19 |
|  | Nickel | 7– 9 |
|  | Carbon | 0.11 maximum |

|  |  | Per cent |
|---|---|---|
| No. 4 | Iron | 80–83 |
|  | Chromium | 16–18 |
|  | Nickel | 0.5 |
|  | Carbon | 1.12 maximum |
| No. 5 | Iron | 70–74 |
|  | Chromium | 18–20 |
|  | Nickel | 8–10 |
|  | Carbon | 0.08 maximum |
| No. 6 | Iron | 68–74 |
|  | Chromium | 18–21 |
|  | Nickel | 8–11 |
| No. 7 | Cobalt | 50 |
|  | Chromium | 30 |
|  | Tungsten | 20 |
| No. 8 | Nickel | 58 |
|  | Iron | 20 |
|  | Molybdenum | 20 |
|  | Manganese | 2 |
| No. 9 | Nickel | 58 |
|  | Molybdenum | 17 |
|  | Chromium | 14 |
|  | Iron | 6 |
|  | Tungsten | 5 |

The following examples will illustrate embodiments of this invention:

*Example I*

250 parts (by weight) of ethyl alcohol containing 6.5 parts of water are treated with a sodium amalgam containing 0.3% (by weight) of sodium at a temperature of 25° C. until 10 parts of sodium have reacted with the alcohol or with the water associated with the alcohol in the presence of a carbon contact electrode. The alcohol is then separated from the amalgam and distilled from the sodium hydroxide formed, about 240 parts of anhydrous ethyl alcohol being recovered. This anhydrous ethyl alcohol is treated with a sodium amalgam of the same concentration at a temperature of 25° C. in the presence of a carbon contact electrode to produce an anhydrous solution of sodium ethylate in ethyl alcohol.

The carbon contact electrode is conveniently arranged in the form of a grid within the reaction vessel contacting both with the amalgam in the lower part of the vessel and with the supernatant alcohol or alcohol solution.

*Example II*

250 parts of anhydrous methyl alcohol are treated with a sodium amalgam containing 0.1% of sodium at a temperature of 20° C. in the presence of a contact electrode such as the first or second of the alloys above identified until 15 parts of sodium have reacted to produce a methyl alcohol solution of sodium methylate. This solution is separated from the amalgam, 250 parts of butyl alcohol are added to the separated solution, and the methyl alcohol content of this mixture is separated by distillation to produce a butyl alcohol solution of sodium butylate. 50 parts of carbon disulphide are added to this anhydrous solution of sodium butylate in butyl alcohol precipitating about 112 parts of sodium butyl xanthate.

*Example III*

250 parts of anhydrous methyl alcohol are treated with a sodium amalgam containing .7% of sodium at a temperature of 25° C. in the presence of a contact electrode in the form of a cast iron grid until 15 parts of sodium have reacted with the alcohol to form sodium methylate. Dry carbon dioxide is introduced into this alcohol solution of sodium methylate at a temperature of 40° C., after separation from the amalgam, until 29 parts have been absorbed. About 64 parts of sodium methyl carbonate are precipitated and separated from the methyl alcohol solution by filtration. The remaining methyl alcohol solution, together with sufficient additional anhydrous methyl alcohol to make up the required total, is treated in a repetition of the operation as first described.

In general, the reaction rate, in the production of alcoholates of alcohols having four carbon atoms or less, in accordance with this invention, increases with increase of reaction temperature and with increase of alkali metal concentration in the amalgam. Temperatures up to the boiling points of the alcohols under the prevailing pressure are useful in carrying out the invention. Amalgams up to the limits of concentration which can be prepared by electrolysis and which remain liquid are useful in carrying out the invention. This reaction rate, however, decreases rapidly as the number of carbon atoms in the alcohol increases. The alcoholates of the higher alcohols, that is alcohols having more than four carbon atoms, can be produced by first forming an alcoholate of the alkali metal in accordance with this invention and then substituting the higher alcohol for the lower alcohol used in the reaction with the alkali metal amalgam, by adding an appropriate quantity of the higher alcohol to the reaction mixture after separation from the amalgam and then distilling off the lower alcohol. This decrease in reaction rate with increase in the number of the carbon atoms of the alcohol make this same procedure useful in connection with the production of alkali metal alcoholates of alcohols having three or four carbon atoms, as in the second of the foregoing examples.

I claim:

1. In the manufacture of alkali metal alcoholates, the improvement which comprises reacting an anhydrous alcohol having not more than four carbon atoms with the corresponding alkali metal amalgam in the presence of a carbon electrode in contact with the amalgam and the alcohol to form the corresponding alkali metal alcoholate.

2. In the manufacture of alkali metal alcoholates, the improvement which comprises reacting an anhydrous alcohol having not more than four carbon atoms with the corresponding alkali metal amalgam in the presence of a graphite electrode in contact with the amalgam and the alcohol to form the corresponding alkali metal alcoholate.

3. In the manufacture of alkali metal alcoholates, the improvement which comprises reacting an anhydrous alcohol having not more than four carbon atoms with the corresponding alkali metal amalgam in the presence of an electrically conducting but non-amalgamating electrode in contact with the amalgam and the alcohol to form the corresponding alkali metal alcoholate.

4. In the manufacture of alkali metal alcoholates, the improvement which comprises reacting an anhydrous alcohol having not more than four carbon atoms with the corresponding alkali metal amalgam in the presence of a metallic but non-amalgamating electrode in contact with the amalgam and the alcohol to form the corresponding alkali metal alcoholate.

5. In the manufacture of alkali metal alcoholates, the improvement which comprises reacting an anhydrous alcohol having not more than four carbon atoms with the corresponding alkali metal amalgam in the presence of a non-amalgamating electrode of an alloy of iron and chromium in contact with the amalgam and the alcohol to form the corresponding alkali metal alcoholate.

6. In the manufacture of alkali metal alcoholates, the improvement which comprises reacting an anhydrous alcohol having not more than four carbon atoms with the corresponding alkali metal amalgam in the presence of a non-amalgamating electrode of an alloy of iron, chromium and nickel in contact with the amalgam and the alcohol to form the corresponding alkali metal alcoholate.

7. In the manufacture of alkali metal alcoholates, the improvement which comprises reacting an anhydrous alcohol having not more than four carbon atoms with the corresponding alkali metal amalgam in the presence of a carbon electrode in contact with the amalgam and the alcohol, separating the alkali metal alcoholate formed from unreacted alcohol and returning the alcohol to the reaction with the amalgam.

8. In the manufacture of alkali metal alcoholates, the improvement which comprises reacting an anhydrous alcohol having not more than four carbon atoms with the corresponding alkali metal amalgam in the presence of an electrically conducting but non-amalgamating electrode in contact with the amalgam and the alcohol to form the corresponding alkali metal alcoholate and then substituting a higher alcohol for that reacted with the amalgam.

GEORGE LEWIS CUNNINGHAM.